United States Patent
Sachs

(10) Patent No.: US 6,282,635 B1
(45) Date of Patent: *Aug. 28, 2001

(54) METHOD AND APPARATUS FOR CONTROLLING AN INSTRUCTION PIPELINE IN A DATA PROCESSING SYSTEM

(75) Inventor: Howard G. Sachs, Belvedere, CA (US)

(73) Assignee: Intergraph Corporation

(*) Notice: Subject to any disclaimer, the term of this patent is extended or adjusted under 35 U.S.C. 154(b) by 0 days.

This patent is subject to a terminal disclaimer.

(21) Appl. No.: 09/375,174

(22) Filed: Aug. 16, 1999

Related U.S. Application Data

(63) Continuation of application No. 08/751,273, filed on Nov. 18, 1996, now Pat. No. 5,996,062, which is a continuation of application No. 08/414,142, filed on Mar. 30, 1995, now abandoned, which is a continuation of application No. 08/158,109, filed on Nov. 24, 1993, now abandoned.

(51) Int. Cl.$^7$ ............................................. G06F 9/38

(52) U.S. Cl. ........................ 712/215; 712/219; 711/203

(58) Field of Search ...................... 712/215, 219, 712/11, 23–25, 205, 213; 711/3, 118, 6, 140, 203–209; 714/2, 15; 710/127

(56) References Cited

U.S. PATENT DOCUMENTS 5,996,062 * 11/1999 Sachs ................................. 712/215

* cited by examiner

Primary Examiner—John Follansbee
(74) Attorney, Agent, or Firm—Townsend and Townsend and Crew LLP

(57) ABSTRACT

An address translation memory stores a plurality of virtual address tags. The virtual address tags typically designate a portion of the virtual address space corresponding to a page of data stored in an intermediate storage device. A portion of an input virtual address is used to address the translation memory, and the resulting output virtual address tag is compared to a relevant portion of the input virtual address. If they match, then the requested data resides in the intermediate storage device, and an instruction issuing unit allows the instructions to continue issuing to an instruction pipeline as scheduled. However, if the virtual address tag does not match the relevant portion of the input virtual address, then it is assumed that a page fault might occur, and the instruction issuing unit inhibits the issuance of further instructions to the instruction pipeline. A page table stored in the second storage memory is then accessed to determine whether in fact the page corresponding to the input virtual address is stored in the second storage device. If so, then the instruction issuing unit resumes issuing instructions to the instruction pipeline. If not, then the page corresponding to the input virtual address is retrieved from first storage device and communicated to the second storage device, and the instruction issuing unit resumes issuing instructions to the instruction pipeline.

29 Claims, 4 Drawing Sheets

RM=$2^{12}$ Pages
PAGE=$2^{12}$ Bytes

METHOD AND APPARATUS FOR CONTROLLING AN INSTRUCTION PIPELINE IN A DATA PROCESSING SYSTEM

This is a continuation of 08/751,273, filed Nov. 18, 1996, now U.S. Pat. No. 5,996,062, which is a continuation of 08/414,142, filed Mar. 30, 1995, now abandoned, which is a continuation of 08/158,109, filed Nov. 24, 1993, now abandoned.

BACKGROUND OF THE INVENTION

The present invention relates to computing systems and, more particularly, to a method and apparatus for controlling multiple instruction pipelines.

Conventional sequential (non-pipelined, flow through) architecture computing systems issue program instructions one at a time and wait for each instruction to complete before issuing the next instruction. That ensures that the result value generated by each instruction is available for use by later instructions in the program. It also facilitates error recovery if an instruction fails to complete successfully and the program terminates abnormally. That is, since memory and register values are predictably altered in accordance with the sequence of program instructions, the problem may be corrected by restoring (backing up) the register values to the state that existed just prior to the issuance of the faulty instruction, fixing the cause of the abnormal termination, and then restarting the program from the faulty instruction. Unfortunately, these computing systems are also inefficient since many clock cycles are wasted between the issuance of one instruction and the issuance of the instruction which follows it.

Many modern computing systems depart from the sequential architectural model. A pipelined architecture allows the next instruction to be issued without waiting for the previous instruction to complete. This allows several instructions to be executed in parallel by doing different stages of the required processing on different instructions at the same time. For example, while one instruction is being decoded, the following instruction is being fetched, and the previous instruction is being executed. Even in a pipelined architecture, however, instructions still both issue and complete in order, so error recovery is still straight forward.

Even more advanced machines employ multiple pipelines that can operate in parallel. For example, a three pipeline machine may fetch three instructions every clock cycle, decode three instructions every clock cycle, and execute three instructions every clock cycle. These computing systems are very efficient. However, not all instructions take the same amount of time to complete, and some later-issued instructions may complete before instructions that issued before them. Thus, when a program terminates abnormally, then it must be determined which instructions completed before the faulty instruction terminated, and the memory and register values must be restored accordingly. That is a very complicated task and, if not handled properly, may eliminate many of the benefits of parallel processing.

One reason for instruction failure is the existence of logic or data errors which make it impossible for the program to proceed (e.g., an attempt to divide by zero). Another reason for instruction failure is an attempt to access data that is temporarily unavailable. This may occur if the computing system employs virtual addressing of data. As explained below, problems caused by virtual addressing are more difficult to overcome.

FIG. 1 is a block diagram of a typical computing system which employs virtual addressing. Computing system 10 includes an instruction issuing unit 14 which communicates instructions to a plurality of (e.g., eight) instruction pipelines 18A–H over a communication path 22. The data referred to by the instructions in a program are stored in a mass storage device 30 which may be, for example, a disk or tape drive. Since mass storage devices operate very slowly (e.g., a million or more clock cycles per access) compared to instruction issuing unit 14 and instruction pipelines 18A–H, data currently being worked on by the program is stored in a main memory 34 which may be a random access memory (RAM) capable of providing data to the program at a much faster rate (e.g., 30 or so clock cycles). Data stored in main memory 34 is transferred to and from mass storage device 30 over a communication path 42. The communication of data between main memory 34 and mass storage device 30 is controlled by a data transfer unit 46 which communicates with main memory 34 over a communication path 50 and with mass storage device 30 over a communication path 54.

Although main memory 34 operates much faster than mass storage device 30, it still does not operate as quickly as instruction issuing unit 14 or instruction pipelines 18A–H. Consequently, computing system 10 includes a high speed cache memory 60 for storing a subset of data from main memory 34, and a very high speed register file 64 for storing a subset of data from cache memory 60. Cache memory 60 communicates with main memory 34 over a communication path 68 and with register file 64 over a communication path 72. Register file 64 communicates with instruction pipelines 18A–H over a communication path 76. Register file 64 operates at approximately the same speed as instruction issuing unit 14 and instruction pipelines 18A–H (e.g., a fraction of a clock cycle), whereas cache memory 60 operates at a speed somewhere between register file 64 and main memory 34 (e.g., approximately two or three clock cycles).

FIGS. 2A–B are block diagrams illustrating the concept of virtual addressing. Assume computing system 10 has 32 bits available to address data. The addressable memory space is then $2^{32}$ bytes, or four gigabytes (4 GB), as shown in FIG. 2A. However, the physical (real) memory available in main memory 34 typically is much less than that, e.g., 1–256 megabytes. Assuming a 16 megabyte (16 MB) real memory, as shown in FIG. 2B, only 24 address bits are needed to address the memory. Thus, multiple virtual addresses inevitably will be translated to the same real address used to address main memory 34. The same is true for cache memory 60, which typically stores only 1–36 kilobytes of data. Register file 64 typically comprises, e.g., 32 32-bit registers, and it stores data from cache memory 60 as needed. The registers are addressed by instruction pipelines 18A–H using a different addressing scheme.

To accommodate the difference between virtual addresses and real addresses and the mapping between them, the physical memory available in computing system 10 is divided into a set of uniform-size blocks, called pages. If a page contains $2^{12}$ or 4 kilobytes (4 KB), then the full 32-bit address space contains $2^{20}$ or 1 million (1 M) pages (4 KB×1 M=4 GB). Of course, if main memory 34 has 16 megabytes of memory, only $2^{12}$ or 4 K of the 1 million potential pages actually could be in memory at the same time (4 K×4 KB=16 MB).

Computing system 10 keeps track of which pages of data from the 4 GB address space currently reside in main memory 34 (and exactly where each page of data is physically located in main memory 34) by means of a set of page tables 100 (FIG. 3) typically stored in main memory 34. Assume computing system 10 specifies 4 KB pages and each page table 100 contains 1 K entries for providing the location of 1 K separate pages. Thus, each page table maps 4 MB of memory (1 K×4 KB=4 MB), and 4 page tables suffice for a machine with 16 megabytes of physical main memory (16 MB/4 MB=4).

The set of potential page tables are tracked by a page directory 104 which may contain, for example, 1 K entries (not all of which need to be used). The starting location of this directory (its origin) is stored in a page directory origin (PDO) register 108.

To locate a page in main memory 34, the input virtual address is conceptually split into a 12-bit displacement address (VA<11:0>), a 10-bit page table address (VA<21:12>) for accessing page table 100, and a 10-bit directory address (<VA 31:22>) for accessing page directory 104. The address stored in PDO register 108 is added to the directory address VA<31:22> of the input virtual address in a page directory entry address accumulator 112. The address in page directory entry address accumulator 112 is used to address page directory 104 to obtain the starting address of page table 100. The starting address of page table 100 is then added to the page table address VA<21:12> of the input virtual address in a page table entry address accumulator 116, and the resulting address is used to address page table 100. An address field in the addressed page table entry gives the starting location of the page in main memory 34 corresponding to the input virtual address, and a page fault field PF indicates whether the page is actually present in main memory 34. The location of data within each page is typically specified by the 12 lower-order displacement bits of the virtual address.

When an instruction uses data that is not currently stored in main memory 34, a page fault occurs, the faulting instruction abnormally terminates, and program control is transferred to the operating system. Thereafter, data transfer unit 42 must find an unused 4 KB portion of memory in main memory 34, transfer the requested page from mass storage device 30 into main memory 34, and make the appropriate update to the page table (indicating both the presence and location of the page in memory). The user program then may be restarted.

In a data processing system such as computing system 10, thousands of CPU cycles elapse from the time an instruction issues until the time it can be determined (by accessing page table 100) if the data requested by the instruction caused a page fault. Hence, if a page fault occurs, then it is necessary to back up the machine over many thousands of successfully completed instructions in order to resume execution at the point of the fault. As noted above, this is very difficult in machines that execute multiple instructions in parallel. Since page faults may occur very frequently depending upon the program, this results in substantial delay and unnecessary duplication of instruction execution.

SUMMARY OF THE INVENTION

The present invention is directed to a method and apparatus for preventing unnecessary backup operations in a computing system which executes multiple instructions in parallel. In general, a translation memory is used to determine if a page fault may occur in the system's main memory when an instruction is issued. If so, then the instructions which issued after that instruction are cancelled before they alter the contents of registers or memory. In this manner, the computing system simulates the sequential architectural model and remains in the same state it was at the time the faulting instruction issued.

More specifically, in one embodiment of the present invention, an address translation memory stores a plurality of virtual address tags. The virtual address tags typically designate a portion of the virtual address space corresponding to a page of data stored in a main memory or other intermediate storage device (e.g., they comprise the untranslated high order bits of a virtual address that corresponds to the translated real address). A portion of an input virtual address (e.g., the low order bits of the virtual address, the number of which is determined by the size of the translation memory) is used to address the translation memory, and the resulting output virtual address tag is compared to a relevant portion of the input virtual address (e.g., the higher order bits). If they match, then the requested data resides in the main memory device, and an issue control unit allows the instructions to complete as scheduled. However, if the virtual address tag does not match the relevant portion of the input virtual address, then it is assumed that a page fault will occur, and the issue control unit inhibits the issuance of further instructions to the instruction pipelines and cancels the instructions that issued since the faulting instructions (before those instructions alter the contents of registers or memory). A page table stored in the main memory device is then accessed to determine whether in fact the page corresponding to the input virtual address is stored in the main memory device. If so, then the issue control unit resumes issuing instructions to the instruction pipelines. If not, then the page corresponding to the input virtual address is retrieved from the mass storage device and communicated to the main memory device, and the issue control unit resumes issuing instructions to the instruction pipelines.

BRIEF DESCRIPTION OF THE PREFERRED EMBODIMENTS

Figure 1:
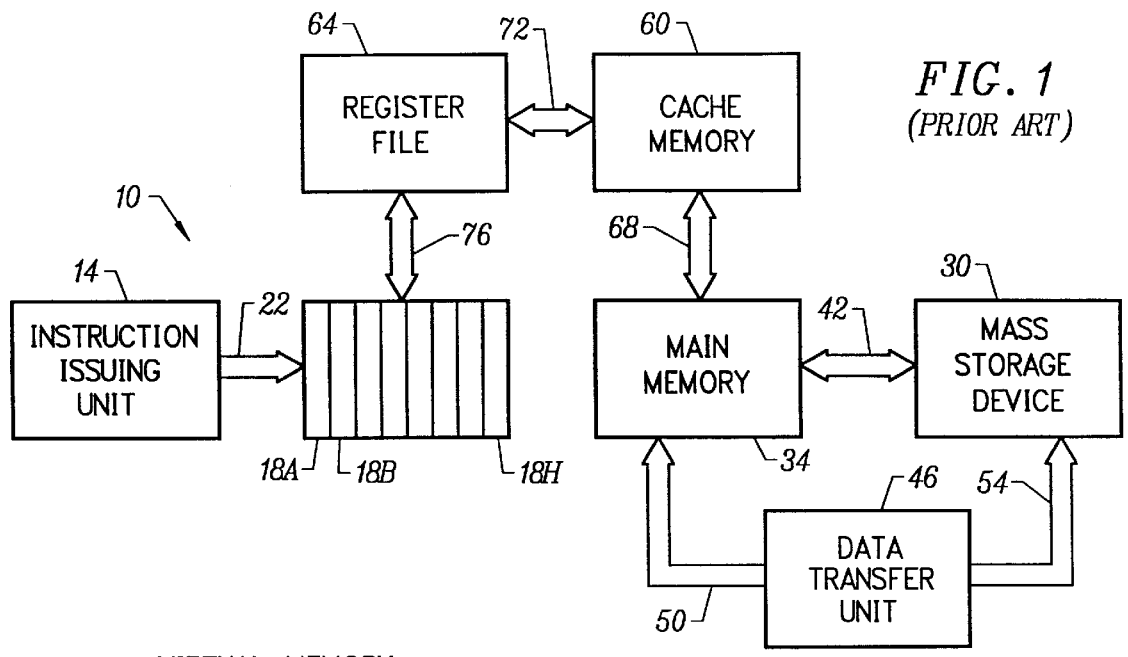
FIG. 1 is a block diagram of a known computing system.
Figure 2A:
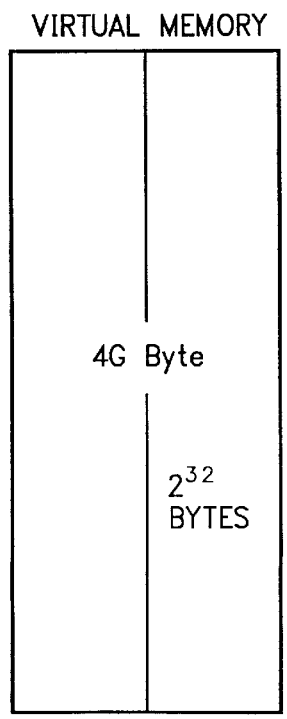
FIGS. 2A–B are diagrams illustrating virtual addressing.
Figure 2B:
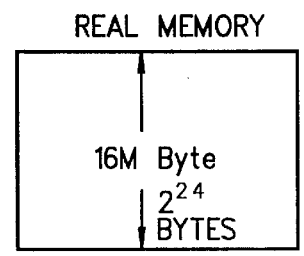
Figure 3:
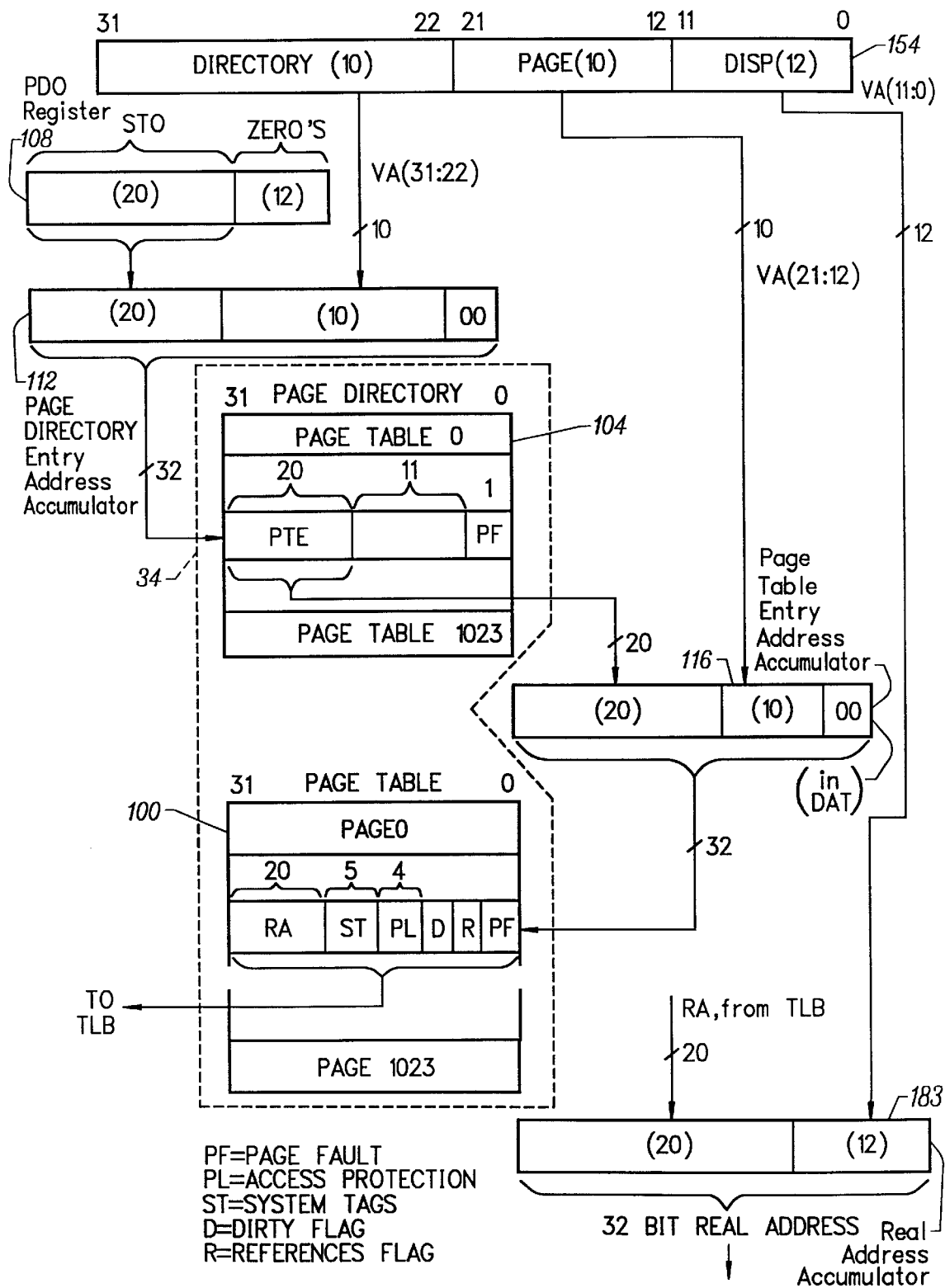
FIG. 3 is a diagram showing how page tables are accessed.
Figure 4:
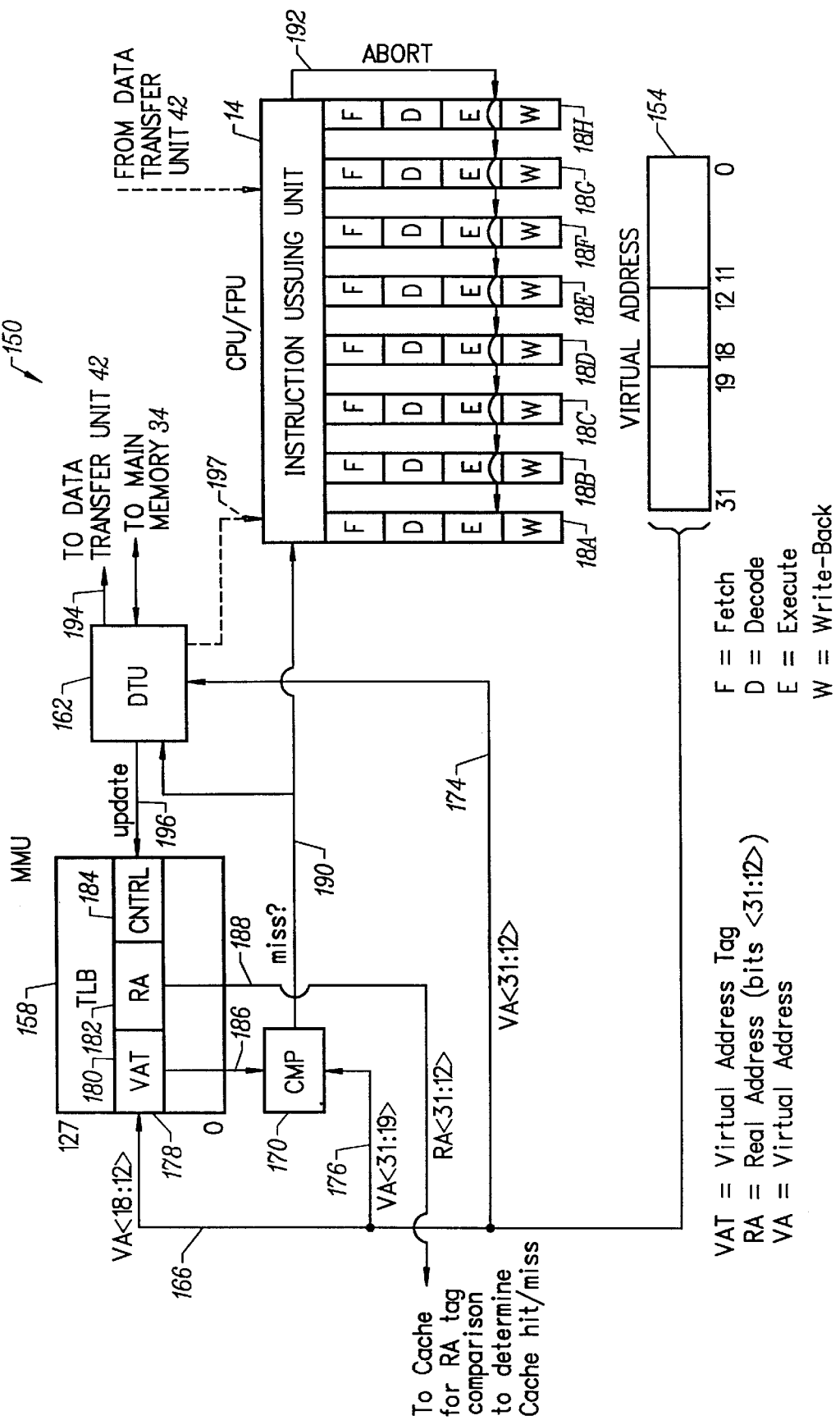
FIG. 4 is a block diagram of a particular embodiment of an apparatus according to the present invention for controlling the instruction pipelines of FIG. 1.

FIG. 4 is a block diagram of a particular embodiment of an apparatus 150 according to the present invention for controlling instruction pipelines 18A–H. Components which remain the same as FIGS. 1 and 3 retain their original numbering. Apparatus 150 includes an address register 154 for receiving an input virtual address which references data used by an instruction issued to one of instruction pipelines 14A–H, a translation memory (e.g., a translation lookaside buffer (TLB)) 158 and comparator 170 for initially determining whether data requested by the input virtual address resides in main memory 34, and a dynamic translation unit (DTU) 162 for accessing page tables in main memory 34. Bits VA[18:12] of the input virtual address are communicated to TLB 158 over a communication path 166, bits VA[31:12] of the input virtual address are communicated to DTU 162 over a communication path 174, and bits VA[31:19] are communicated to comparator 170 over a communication path 176.

TLB 158 includes a plurality of addressable storage locations 178 that are addressed by bits VA[18:12] of the input virtual address. Each storage location stores a virtual address tag (VAT) 180, a real address (RA) 182 corresponding to the virtual address tag, and control information (CNTRL) 184. How much control information is included depends on the particular design and may include, for example, access protection flags, dirty flags, referenced flags, etc.

The addressed virtual address tag is communicated to comparator 170 over a communication path 186, and the addressed real address is output on a communication path 188. Comparator 170 compares the virtual address tag with bits VA[31:22] of the input virtual address. If they match (a TLB hit), then the real address output on communication path 188 is compared with a real address tag (not shown) of a selected line in cache memory 60 to determine if the requested data is in the cache memory (a cache hit). An example of this procedure is discussed in U.S. Pat. No. 4,933,835 issued to Howard G. Sachs, et al. and incorporated herein by reference. If there is a cache hit, then the pipelines may continue to run at their highest sustainable speed. If the requested data is not in cache memory 60, then the real address bits on communication path 188 are combined with bits [11:0] of the input virtual address and used to obtain the requested data from main memory 34.

If the virtual address tag did not match bits VA[31:19] of the input virtual address, then comparator 170 provides a miss signal on a communication path 190 to DTU 162 and to instruction issuing unit 14. The miss signal indicates that the requested data is not currently stored in main memory 34, or else the data is in fact present in main memory 34 but the corresponding entry in TLB 158 has been deleted.

When the miss signal is generated, instruction issuing unit 14 cancels the instructions that issued after the instruction that generated the miss condition by providing an abort signal on a communication path 192 to the execute logic in each pipeline 18A–H. Instruction issuing unit 14 also inhibits further issuing of instructions to instruction pipelines 18A–H until the reason for the mismatch is resolved. In the meantime, DTU 162 accesses the page tables in main memory 34 to determine whether in fact the requested data is currently stored in main memory 34. If not, then DTU 162 instructs data transfer unit 42 through a communication path 194 to fetch the page containing the requested data from mass storage device 30. In any event, TLB 158 is updated through a communication path 196, and instruction issuing resumes.

Figure 5:
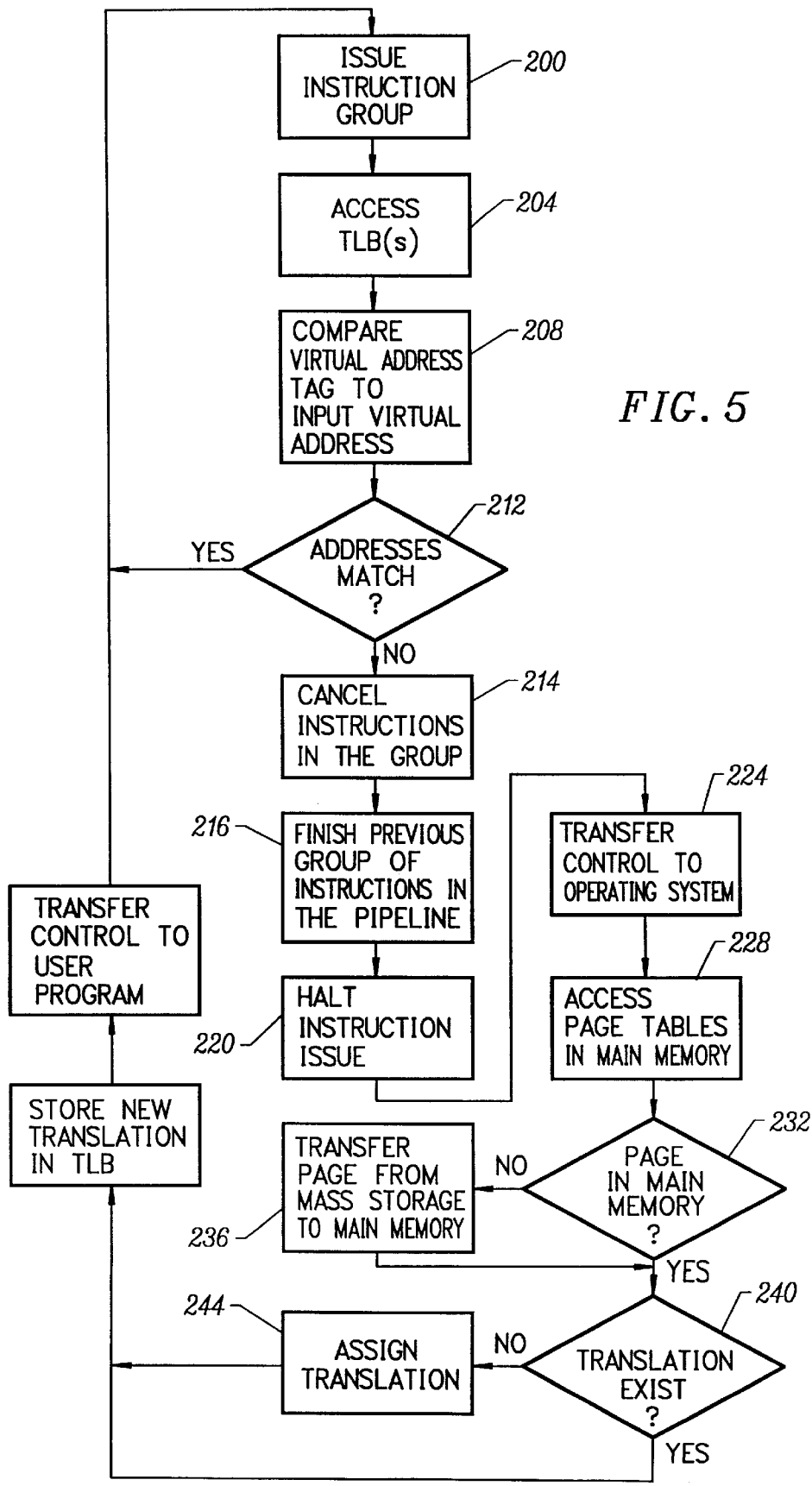
FIG. 5 is a flow chart of a particular embodiment of a method according to the present invention for controlling the instruction pipelines of FIG. 1.

FIG. 5 is a flow chart showing the operation of apparatus 150. When instruction issuing unit 14 issues a group of instructions to instruction pipelines 18A–H in a step 200, bits VA[18:12] of each input virtual address are used to address one of the storage locations 178 in TLB 158 in a step 204. The virtual address tag output from TLB 158 is compared to bits VA[31:19] of the corresponding input virtual address in a step 208, and it is ascertained in a step 212 whether the two addresses match. If so, then the requested data currently resides in main memory 34, and instruction issuing continues in step 200.

If the addresses do not match, then a miss signal is generated on communication path 190, instruction issuing unit 14 cancels the instructions in the current group in a step 214 (by preventing updating of the registers by any instructions in that group), allows the previous group of instructions in the pipeline to complete (and update the registers) in a step 216, and halts instruction issuing in a step 220. Program control is then transferred to the operating system in a step 224, whereupon DTU 162 accesses the page tables in main memory 34 (in the manner discussed above in conjunction with FIG. 3) in a step 228. Once the correct page table entry is located, it is ascertained in a step 232 (e.g., by examining the PF bit) whether the page containing the requested data is in fact currently stored in main memory 34. If not, then the requested page is transferred from mass storage device 30 to main memory 34 in a step 236. In any event, it is then ascertained in a step 240 whether a virtual-to-real address translation exists for the page in a step 240. If not, then a translation is assigned to the page in a step 244. Thereafter, TLB 158 is updated by storing bits VA[31:19] of the input virtual address together with bits [31:12] of the real address and any desired control information from the page table entry in the proper TLB storage location in a step 248, control is transferred to the user program in a step and instruction issuing resumes in step 200.

If the page table entry indicates that the page containing the requested data is not currently stored in main memory 34, then DTU 162 instructs data transfer unit 42 to transfer the page containing the requested data from mass storage 30 to main memory 34 in a step 232. TLB 158 is updated (as above) in step 228, and instruction issuing resumes in step 200.

While the above is a complete description of a preferred embodiment of the present invention, various modifications may be employed. For example, the issuing of each instruction could be held until a TLB hit signal is received from a previous instruction on communication path 190. Additionally, in the case of a TLB miss, instruction issuing could be held until TLB 158 is updated and a hit signal is provided on communication path 190, or else instruction issuing may resume as soon as it is determined that either the data already resides in main memory 34 (via a signal from DTU 162 on a communication path 197) or that the data is in the process of being communicated from mass storage 30 to main memory 34 (via a signal on communication path 197 or a signal from data transfer unit 42 on a communication path 198). Finally, multiple TLB's could be employed (one per load/store pipeline), with corresponding comparators and communication paths to instruction issuing unit 14 to effect the operations noted above whenever any of the TLB's generate a miss signal to instruction issuing unit 14. Consequently, the scope of the invention should be ascertained by the following claims.

What is claimed is:

1. An apparatus configured to control parallel instruction pipelines comprises:

an instruction issuing unit configured to issue a first group of parallel instructions and thereafter to issue a second group of parallel instructions, one instruction from the first group of instructions including a virtual address, the virtual address including a first portion and a second portion;

a translation lookaside buffer configured to receive the first portion of the virtual address, and configured to output a virtual address tag and a real address in response to the first portion of the virtual address;

a comparator coupled to the translation lookaside buffer, configured to receive the second portion of the virtual address, and configured to output a miss signal when the second portion of the virtual address does not match the virtual address tag;

a data transfer unit coupled to the translation lookaside buffer, configured to receive the virtual address, configured to determine whether a page of data corresponding to the virtual address is stored in a main memory in response to the miss signal, and configured to store the second portion of the virtual address as the virtual address tag in the translation look aside buffer, in response to the miss signal, when the page of data is stored in the main memory;

wherein the instruction issuing unit is also configured to cancel the second group of parallel instructions in response to the miss signal, and configured to re-issue the second group of parallel instructions in response to removal of the miss signal.

2. The apparatus of claim 1 wherein the translation lookaside buffer is also configured to output control information in response to the first portion of the virtual address.

3. The apparatus of claim 2 wherein the control information comprises access protection flags.

4. The apparatus of claim 2 wherein the control information comprises data from the set: dirty flags and referenced flags.

5. The apparatus of claim 1 wherein the second portion of the virtual address comprise more significant bits of the virtual address than the first portion of the virtual address.

6. The apparatus of claim 1 further comprising a cache coupled to the translation look aside buffer, configured to receive the real address, and configured to output an indication whether data associated with the real address is stored in the cache.

7. The apparatus of claim 6 wherein the indication is a cache hit.

8. The apparatus of claim 1 further comprising another data transfer unit, the another data transfer unit configured to retrieve the page of data corresponding to the virtual address from a mass storage unit when the page of data is not stored in the main memory.

9. The apparatus of claim 8 wherein the another data transfer unit is also configured to store the page of data in the main memory when the page of data is not stored in the main memory.

10. The apparatus of claim 1 further comprising a page table, the page table configured to indicate when the page of data corresponding to the virtual address is stored in the main memory.

11. A method for controlling a plurality of parallel instruction pipelines includes:
issuing a first group of parallel instructions, one instruction from the first group of instructions including a virtual address, the virtual address including a first portion and second portion; thereafter
issuing a second group of parallel instructions,
addressing a translation lookaside buffer with the first portion of the virtual address;
outputting a virtual address tag and a real address from the translation lookaside buffer in response to the first portion of the virtual address;
outputting a miss signal when the second portion of the virtual address does not match the virtual address tag;
canceling the second group of parallel instructions in response to the miss signal;
addressing a data transfer unit with the virtual address;
storing the second portion of the virtual address as the virtual address tag in the translation look aside buffer, in response to the miss signal, when a page of data corresponding to the virtual address is stored in a main memory; and thereafter
re-issuing the second group of parallel instructions.

12. The method of claim 11 further comprising outputting control information in response to the first portion of the virtual address.

13. The method of claim 12 wherein the control information comprises data selected from the set: access protection flags, dirty flags, referenced flags.

14. The method of claim 11 wherein the second portion of the virtual address comprise more significant bits of the virtual address than the first portion of the virtual address.

15. The method of claim 11 further comprising addressing a cache coupled to the translation look aside buffer with the real address.

16. The method of claim 11 further comprising outputting an indication whether data associated with the real address is stored in the cache.

17. The method of claim 16 wherein the indication is a cache hit.

18. The method of claim 11 further comprising determining with the data transfer unit whether the page of data corresponding to the virtual address is stored in the main memory.

19. The method of claim 18 further comprising retrieving the page of data corresponding to the virtual address from a mass storage unit when the page of data is not stored in the main memory.

20. The method of claim 19 further comprising storing the page of data in the main memory when the page of data is not stored in the main memory.

21. A method for controlling parallel instruction pipelines comprises:
issuing a first set of parallel instructions to the parallel instruction pipelines, one instruction in the first set comprising an input virtual address, the input virtual address comprising a first portion and a second portion;
outputting a virtual address tag from an address translator in response to the first portion of the input virtual address;
comparing the virtual address tag to the second portion of the input virtual address;
preventing a second set of parallel instructions to be issued to the parallel instruction pipelines when the virtual address tag and the input virtual address do not match;
determining whether a page of data associated with the input virtual address is stored in a main memory; and
issuing the second set of parallel instructions to the parallel instruction pipelines when the page of data is stored in the main memory.

22. The method of claim 21 further comprising retrieving the page of data from a mass storage device when the page of data is not stored in the main memory.

23. The method of claim 21 wherein determining whether a page of data associated with the input virtual address is stored in a main memory comprises accessing a page table in the main memory.

24. The method of claim 21 further comprising outputting a real address from the address translator in response to the first portion of the input virtual address.

25. The method of claim 24 further comprising determining whether data associated with the real address is stored in a cache.

26. The method of claim 21 further comprising outputting control information from the address translator in response to the first portion of the input virtual address.

27. The method of claim 26 wherein the control information comprises flags.

28. The method of claim 27 wherein the flags are selected from the class: access protection flags, dirty flags, referenced flags.

29. The method of claim 21 wherein the addresses translator comprises a translation lookaside buffer.

* * * * *